United States Patent [19]
King et al.

[11] 3,764,794
[45] Oct. 9, 1973

[54] ILLUMINATION AND VIEWING SYSTEM FOR VACUUM OR PRESSURE CHAMBER

[75] Inventors: James Robert King, Van Nuys; Gerald D. Myers, Sepulveda, both of Calif.

[73] Assignee: King Nutronics Corporation, Van Nuys, Calif.

[22] Filed: May 5, 1972

[21] Appl. No.: 250,594

[52] U.S. Cl. ................................................ 240/2 R
[51] Int. Cl. .......................................... F21v 33/00
[58] Field of Search ............. 240/2 R, 2 VC, 2 MA, 240/2 W

[56] References Cited
UNITED STATES PATENTS
1,311,186  7/1919  Silverman ........................ 240/2 MA FOREIGN PATENTS OR APPLICATIONS
341,708  1/1931  Great Britain ................... 240/2 VC Primary Examiner—Fred L. Braun
Attorney—Ford W. Harris, Jr. et al.

[57] ABSTRACT

A vacuum or pressure chamber having a door provided therein with a circular transparent window and a circular, tubular viewing port in front of and smaller than the window. An annular lamp encircles the tubular viewing port in front of and adjacent the window and serves to illuminate the interior of the chamber.

4 Claims, 3 Drawing Figures

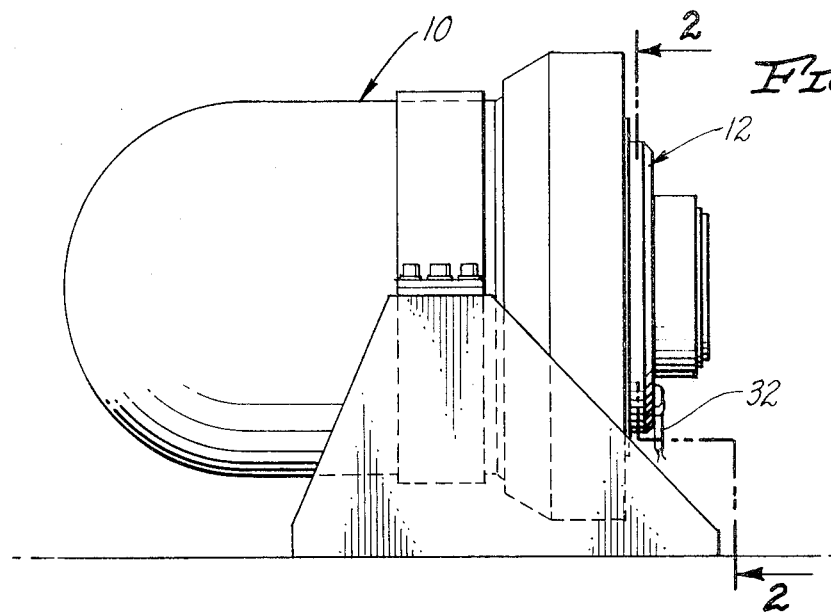
FIG. 1.
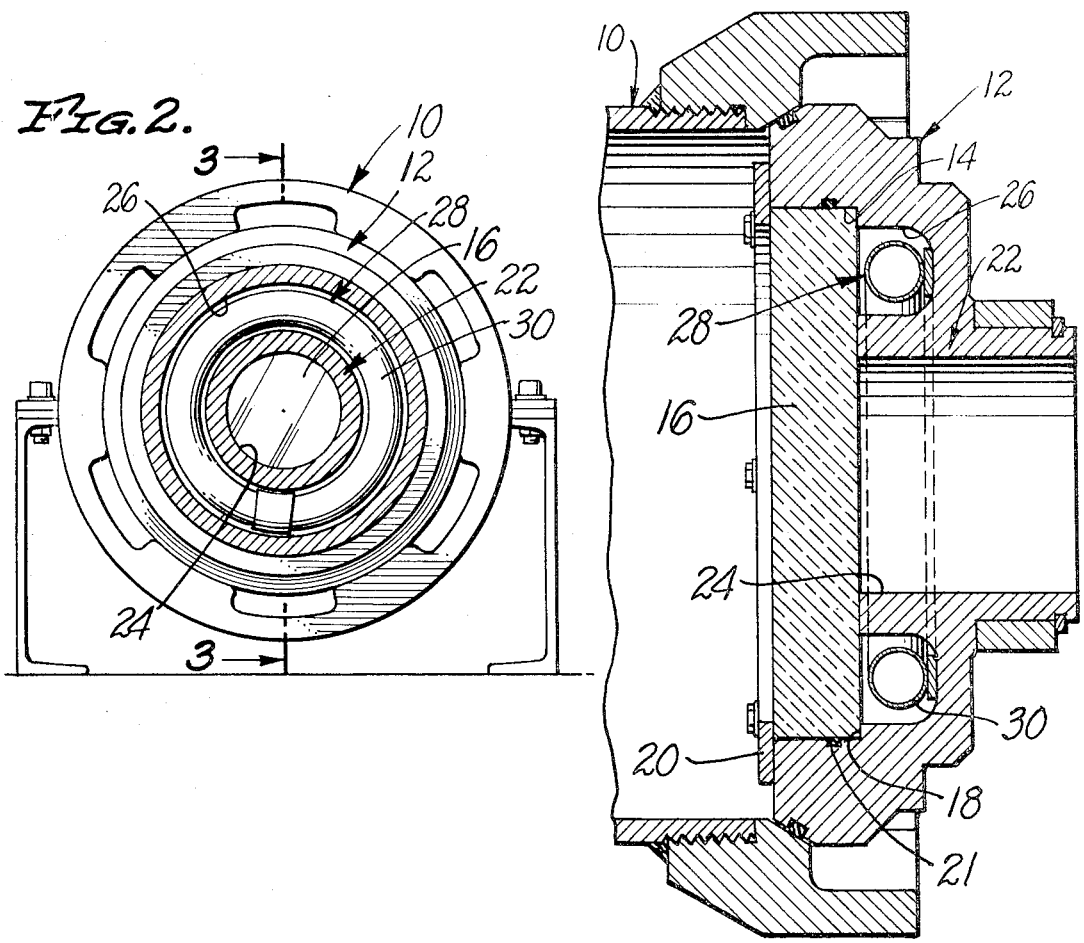
FIG. 2.
FIG. 3.

ILLUMINATION AND VIEWING SYSTEM FOR VACUUM OR PRESSURE CHAMBER

BACKGROUND OF INVENTION

The present invention relates in general to an illumination and viewing system which illuminates a chamber on one side of a wall and which permits viewing of the interior of the chamber from the opposite side of the wall.

Since the invention is particularly applicable to an illumination and viewing system for a pressure or vacuum chamber having a door provided with a viewing window therein, the invention will be considered in such connection herein for convenience. However, it will be understood that the invention is susceptible of other applications.

SUMMARY AND OBJECTS OF INVENTION

A general object of the invention is to provide an illumination and viewing system which includes illuminating means externally of the chamber so that it is not affected by high pressure or vacuum within the chamber.

More particularly, an important object of the invention is to provide an illuminating means which illuminates the interior of the chamber through the viewing window.

Another important object is to provide an illumination and viewing system wherein the illuminating means does not interfere with viewing of the interior of the chamber through the window.

Still another important object is to provide a tubular viewing port which is coaxial with the window and which shields the viewer from the illuminating means.

The invention may be summarized as including, and a further important object is to provide an illumination and viewing system which includes: a chamber wall having a circular window opening; a circular transparent window in the opening; tubular viewing means of circular cross section providing a circular viewing port coaxial with and smaller than the window; and annular illuminating means adjacent and in front of the window and encircling the tubular viewing means.

With the foregoing construction, the illuminating means illuminates the interior of the chamber through the periphery of the window, while the tubular viewing means, which is opaque, shields the viewer from direct light from the illuminating means, which are important features.

The foregoing objects, advantages, features and results of the present invention, together with various other objects, advantages, features and results which will be evident to those skilled in the art to which the invention relates in the light of this disclosure, may be achieved with the exemplary embodiment of the invention illustrated in the accompanying drawing and described in detail hereinafter.

DESCRIPTION OF DRAWING

In the drawing:

FIG. 1 is a side elevation view of a vacuum or pressure chamber which includes a door embodying the illumination and viewing system of the invention;

FIG. 2 is a transverse sectional view taken as indicated by the arrowed line 2—2 of FIG. 1; and FIG. 3 is an enlarged longitudinal sectional view taken as indicated by the arrowed line 3—3 of FIG. 2 of the drawing.

DESCRIPTION OF EXEMPLARY EMBODIMENT OF INVENTION

In the drawing, the numeral 10 designates generally a pressure or vacuum chamber equipped with a chamber wall or door 12. This door may be mounted for opening and closing movement in any suitable manner, not shown.

The door is provided therein with a circular window opening 14 containing a circular transparent window 16. The latter is seated against an inwardly facing annular shoulder 18 to resist internal pressure within the chamber 10. The window 16 is secured in its opening 14 by an annular retainer 20 which resists negative pressure within the chamber. An O-ring seal 21 encircles the window 16.

Coaxial with the circular window 16 is a tubular viewing means 22 of circular cross section which forms part of the door 12 and which provides a tubular viewing port 24 of circular cross section. The viewing port 24 is considerably smaller than the window 16.

Provided in the door 12 in front of and adjacent the periphery of the window 16 is an inwardly facing, annular recess 26 which encircles the tubular viewing means 22. Within the recess 26 is an annular illuminating means 28 which also encircles the tubular viewing means 22. Preferably, the annular illuminating means 28 is simply an annular lamp 30 suitably mounted in the recess 26 and suitably connected to a source of electricity, as by means of an electric cord 32, FIG. 1.

With the foregoing construction, the annular lamp 30 is located externally of the chamber 10 so that it is not affected by pressure or vacuum within the chamber, the O-ring 21 preventing a positive or negative pressure in the chamber from reaching the lamp. The lamp 30 illuminates the interior of the chamber 10 through the peripheral portions of the window 16 and, at the same time, the tubular viewing means 22 shields the viewer from direct light emanating from the lamp 30 while providing a clear field of view through the central portions of the window. Thus, the invention provides a very simple and effective way of illuminating the interior of a chamber, such as the chamber 10, through a wall thereof, such as the door 12.

Although an exemplary embodiment of the invention has been disclosed for purposes of illustration, it will be understood that various changes, modifications and substitutions may be incorporated in such embodiment without departing from the spirit of the invention as defined by the claims appearing hereinafter.

We claim as our invention:

1. In an illumination and viewing system, the combination of:
    a chamber including a wall separating a viewer from an object to be viewed within the chamber, said wall having a window opening therein;
    a transparent window in said opening;
    tubular means having an open end on one side of said wall providing a viewing port in register with and smaller than said window for viewing an object on the other side of said wall; and
    illuminating means on said one side of said wall adjacent said window and spaced laterally outward of said tubular means for projecting light directly through said window to illuminate said object, said tubular means including a shield for blocking direct light from said illuminating means to the viewer at the open end of said tubular means.

2. A system as defined in claim 1 wherein said tubular means includes a window end positioned substantially flush with said window, said window end forming said shield.

3. A system as defined in claim 2 wherein said illuminating means is positioned about said tubular means and overlies said window.

4. A system as defined in claim 2 wherein said chamber is a pressure or vacuum chamber, and said window is sealed in said window opening.

* * * * *